US010328977B2

(12) United States Patent
Patel et al.

(10) Patent No.: US 10,328,977 B2
(45) Date of Patent: Jun. 25, 2019

(54) ENERGY ABSORBING LOAD TRANSMITTAL BRACKET WITH WELD ACCESSIBILITY

(71) Applicant: Ford Global Technologies, LLC, Dearborn, MI (US)

(72) Inventors: Deepak Patel, Canton, MI (US); Robert Schwalm, Windsor (CA); Stephen W. Siu, Bloomfield, MI (US); Greg B. Zinn, Canton, MI (US); Djamal Eddine Midoun, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 197 days.

(21) Appl. No.: 15/642,945

(22) Filed: Jul. 6, 2017

(65) Prior Publication Data

US 2017/0297626 A1   Oct. 19, 2017

Related U.S. Application Data

(62) Division of application No. 14/819,831, filed on Aug. 6, 2015, now Pat. No. 9,731,769.

(51) Int. Cl.
*B62D 21/15* (2006.01)
*B62D 25/20* (2006.01)

(52) U.S. Cl.
CPC ....... *B62D 21/157* (2013.01); *B62D 25/2036* (2013.01)

(58) Field of Classification Search
CPC ........................... B62D 21/157; B62D 25/2036

USPC ............ 296/187.03, 187.04, 187.05, 187.08, 296/187.11, 187.12; 293/102, 132, 133
See application file for complete search history.

(56) References Cited

U.S. PATENT DOCUMENTS

| 7,328,938 | B2 | 2/2008 | Matsuda |
| 8,052,199 | B2 | 11/2011 | Brunner et al. |
| 8,079,635 | B2 | 12/2011 | DeVor et al. |
| 8,292,356 | B2 | 10/2012 | Ishigame et al. |
| 8,567,857 | B2 | 10/2013 | Fujii et al. |
| 9,302,715 | B2 | 4/2016 | Kim et al. |
| 2009/0146457 | A1 | 6/2009 | Kanagai et al. |
| 2011/0210582 | A1* | 9/2011 | Mori ................... B62D 21/157 296/193.07 |
| 2017/0015360 | A1* | 1/2017 | Onishi ................ B62D 21/157 |

FOREIGN PATENT DOCUMENTS

| JP | 2008265456 | 11/2008 |
| JP | 2009126419 A | 6/2009 |

* cited by examiner

*Primary Examiner* — Joseph D. Pape
(74) *Attorney, Agent, or Firm* — Frank A. MacKenzie; Bejin Bieneman PLC

(57) ABSTRACT

A vehicle body structure includes a floor panel, a door frame, a cross-member, and a load transmittal bracket. The door frame and the cross-member are fixed relative to the floor panel. The door frame defines a door opening. The load transmittal bracket is disposed between the door opening and the cross-member. The load transmittal bracket includes a second segment welded to a first segment and to the floor panel. During a side impact of the vehicle, the load transmittal bracket transfers impact force from the door frame to the cross-member to dissipate the impact force and reduce deformation of the floor.

8 Claims, 7 Drawing Sheets

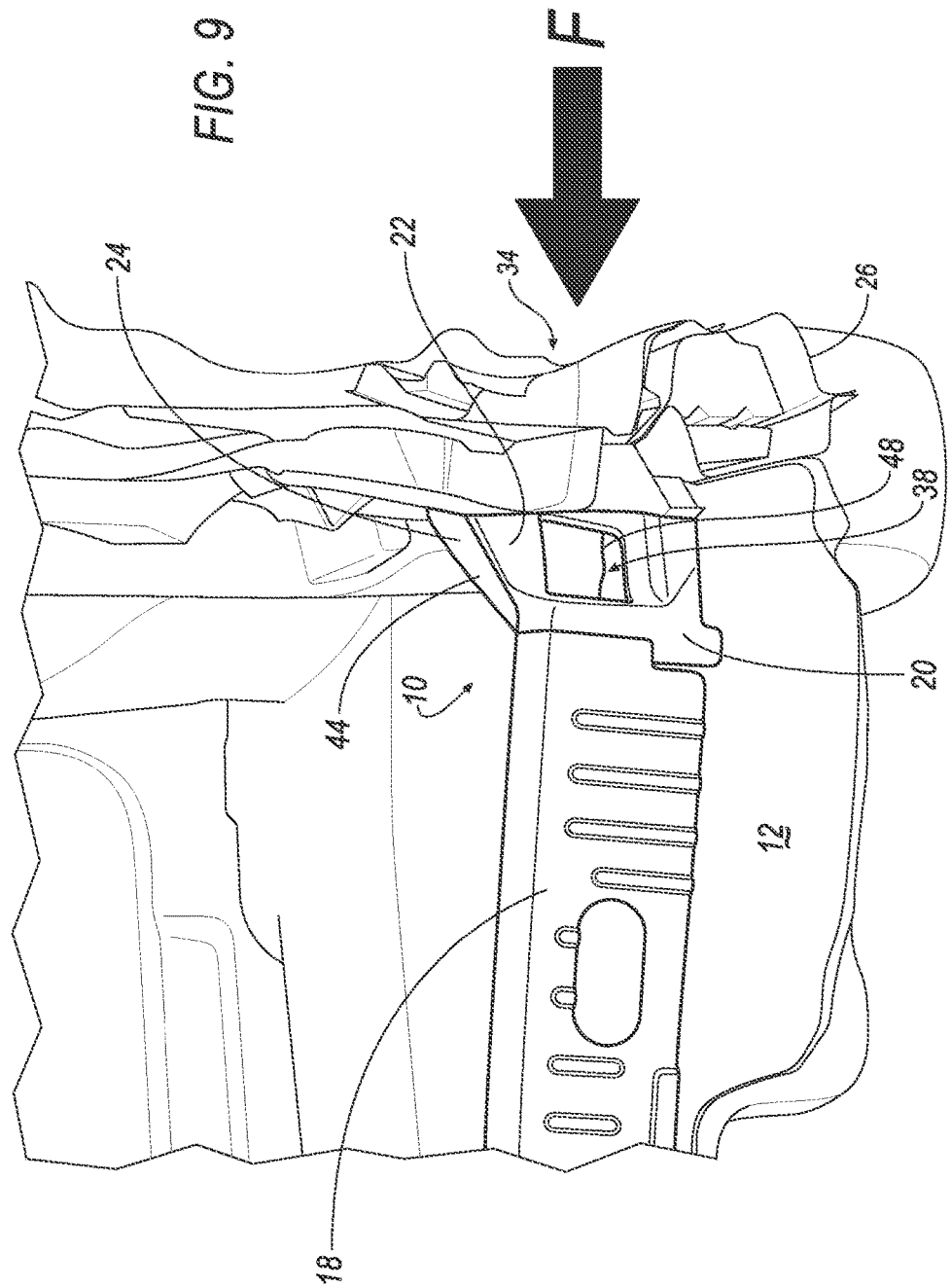

ENERGY ABSORBING LOAD TRANSMITTAL BRACKET WITH WELD ACCESSIBILITY

CROSS-REFERENCE TO RELATED APPLICATIONS

This patent application is a divisional of and claims priority to and all advantages of U.S. patent application Ser. No. 14/819,831 filed on Aug. 6, 2015, which is herein incorporated by reference in its entirety.

BACKGROUND

Vehicles, such as automobiles, include body structures to absorb energy during a vehicle impact, for example, a vehicle-to-vehicle impact. During the vehicle impact, components of the vehicle may deform to absorb energy. For example, the vehicle may include exterior panels, e.g., doors, fenders, etc., a body structure supporting the exterior panels, and a floor disposed below a passenger compartment of the vehicle. In the case of a side impact to the vehicle, the exterior panels may deform and impact the body structure. If the impact is of sufficient magnitude, the body structure may be forced into the floor and may cause the floor to deform.

The design of components of the vehicle body structure is subject to several constraints, such as packaging constraints, manufacturing constraints, vehicle assembly constraints, cost constraints, etc. There remains an opportunity to design a vehicle body structure that effectively absorbs and transfers energy in a manner that accommodates these design considerations.

BRIEF DESCRIPTION OF THE DRAWINGS

FIG. 9 is a perspective view of the load transmittal bracket in a vehicle during a side impact.

DETAILED DESCRIPTION

Figure 1:
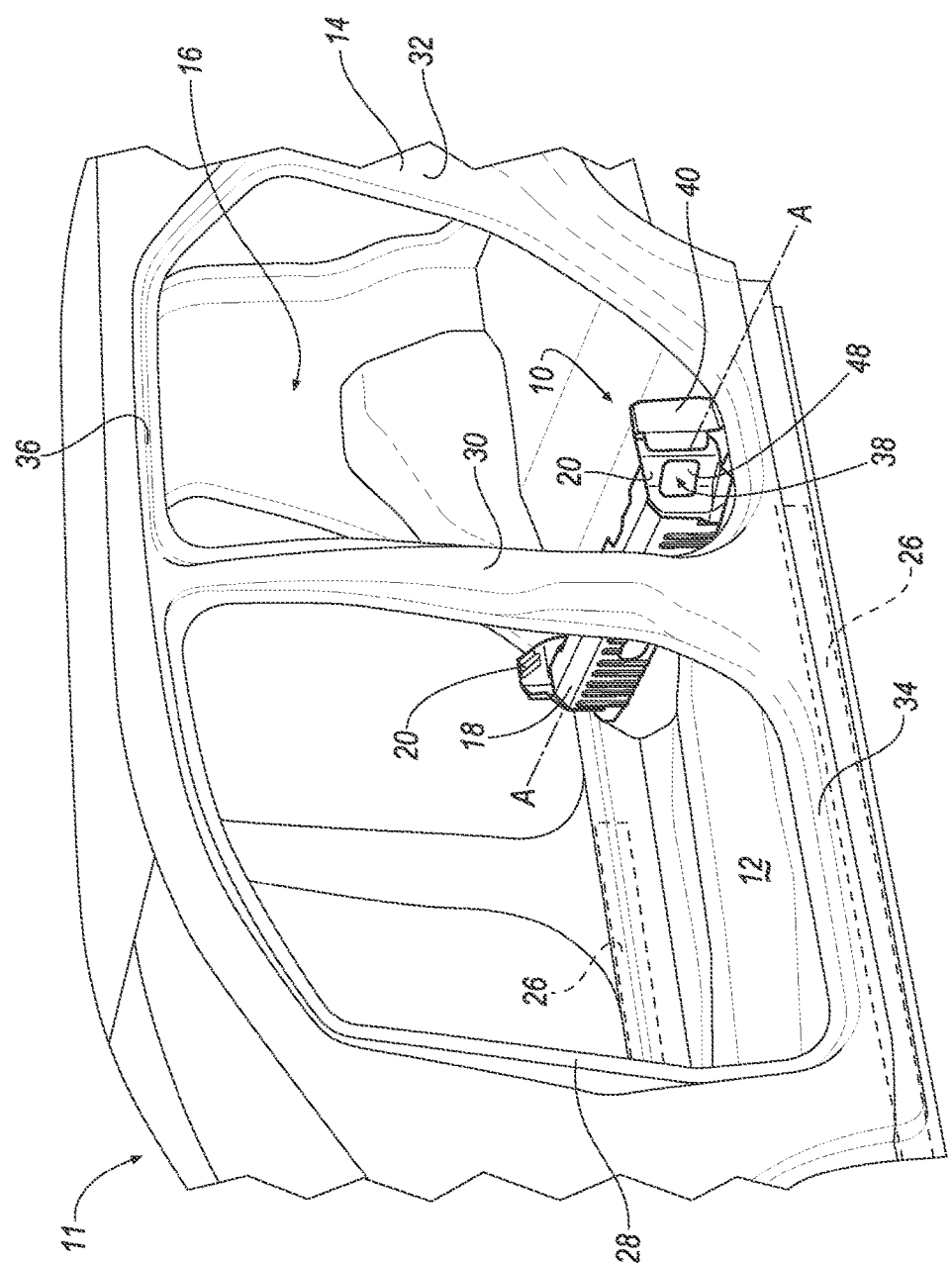
FIG. 1 is a perspective view of a load transmittal bracket in a vehicle.

With reference to the Figures, wherein like numerals indicate like parts throughout the several views, a vehicle body structure 10 includes a floor panel 12. The vehicle body structure 10 includes a door frame 14 fixed relative to the floor panel 12 and defining a door opening 16. A cross-member 18 is fixed relative to the floor panel 12. A load transmittal bracket 20 is disposed between the cross-member 18 and the door opening 16. The load transmittal bracket 20 includes a first segment 22 and a second segment 24. The second segment 24 is welded to the first segment 22 and to the floor panel 12.

During a side impact of the vehicle 11, an impact force F may deform the door frame 14 and force the door frame 14 toward the load transmittal bracket 20. The load transmittal bracket 20 transfers the impact force F to the cross-member 18, as set forth further below, to dissipate the impact force F. Specifically, as set forth further below, the second segment 24 of the load transmittal bracket 20 may initially receive the impact force F. Since the second segment 24 is welded to the first segment 22, the first segment 22 and second segment 24 may transfer the impact force F to the cross-member 18, and consequently disperse the impact force F to other components of the vehicle 11, as described further below.

Figure 2:
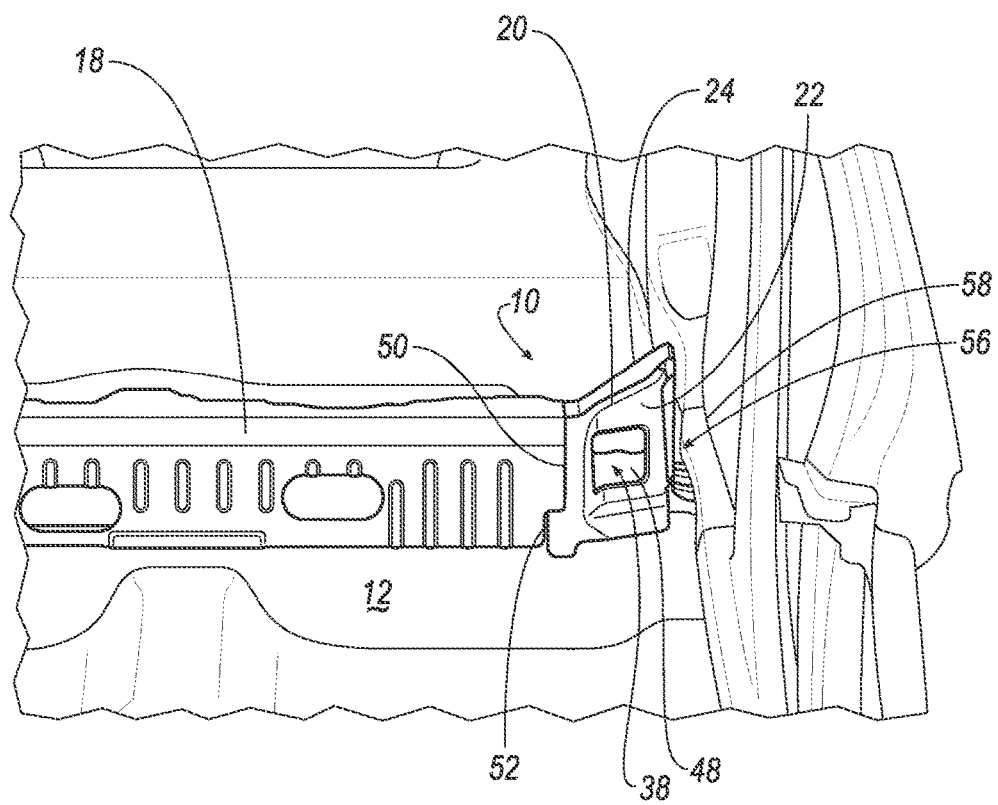
FIG. 2 is a perspective view of the load transmittal bracket in the vehicle.
Figure 3:
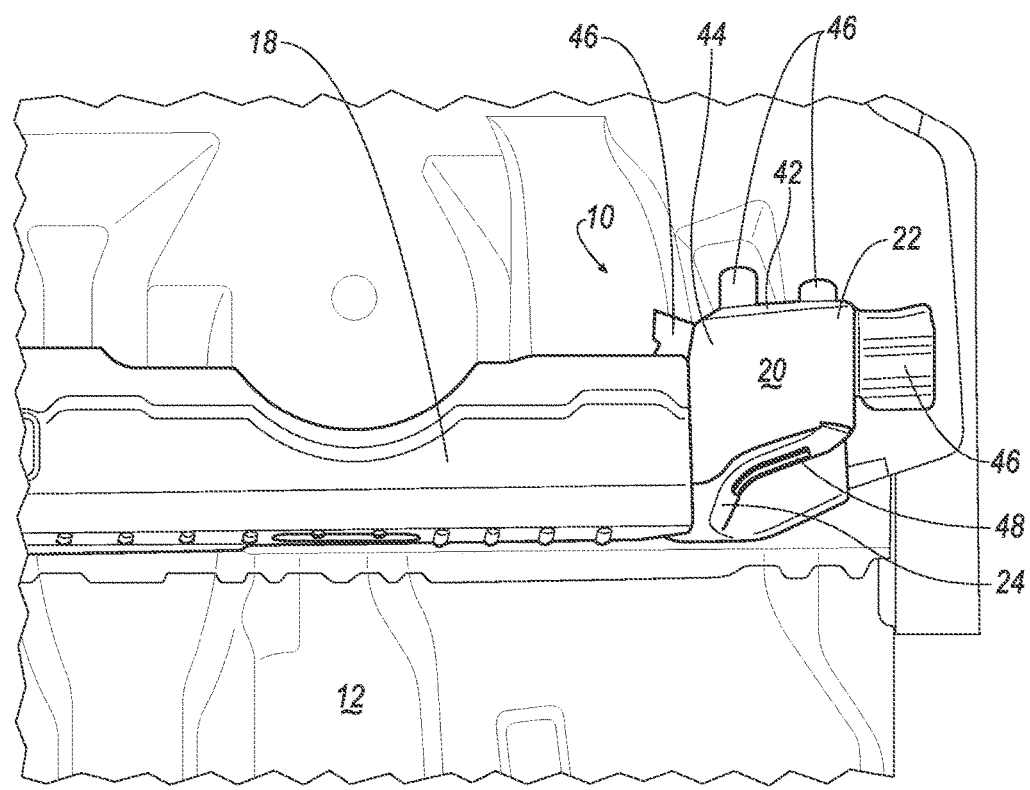
FIG. 3 is a top view of the load transmittal bracket in the vehicle.

As shown in FIGS. 1-3, the floor panel 12 may extend over a substantial lower portion of the vehicle 11 and other components, e.g., seats, upholstery, center console, etc. of the vehicle 11 may be mounted to and/or supported by the floor panel 12. The floor panel 12 may support the cross-member 18 and the load transmittal bracket 20 of the vehicle body structure 10. The floor panel 12 may assist in dissipating the impact force F to other components of the vehicle 11, as described below. The floor panel 12 may be formed of any suitable material such as sheet metal, e.g., steel, aluminum, etc.

As shown best in FIG. 1, the vehicle body structure 10 may include a pair of rails 26 spaced from each other below the floor panel 12. The floor panel 12 may be mounted to the rails 26, e.g., by welding. The rails 26 may absorb energy from the load transmittal bracket 20 and may dissipate at least a portion of the impact force F to other components of the vehicle 11, as described below. The rails 26 may be formed of sheet metal, e.g., steel, or aluminum or any suitable material. The rail 26 extends toward the load transmittal bracket 20, and may terminate short of the load transmittal bracket 20, as shown in FIG. 1.

The vehicle body structure 10 may include two load transmittal brackets 20, as shown in FIG. 1. The load transmittal brackets 20 may be disposed on opposite ends of the cross-member 18. The load transmittal brackets may mirror each other about the cross-member 18. During a side impact, the 26 on the side of impact may transfer the energy the adjacent load transmittal bracket 20, which subsequently may transfer the energy to the cross-member 18, which subsequently may transfer the energy to the other load transmittal bracket 20, which subsequently may transfer the energy to the other rail. The vehicle body structure 10 may include pillars, e.g., a A-pillar 28, a B-pillar 30, and a C-pillar 32. The door frame 14 may be defined in part by the B-pillar 30 and the C-pillar 32. The B-pillar 30 defines a first side of the door frame 14 and the C-pillar 32 defines a second side opposite the first side. The door frame 14 may be further defined by a lower sill 34 defining a third side and an upper sill 36 defining a fourth side opposite the third side. The door frame 14 may alternatively be defined between the A-pillar 28 and the B-pillar 30.

The cross-member 18 extends along an axis A, e.g., from the left side to the right side of the vehicle 11. The cross-member 18 may be a beam mounted to the floor panel 12, as shown in FIGS. 1-3 and 9. In other words, the cross-member 18 may be a separate component from the floor panel 12 that is fixed to the floor panel. Alternatively, the cross-member 18 may be integral with the floor panel 12, e.g., formed simultaneously with the floor panel 12 as a single continuous unit. For example, the cross-member 18 and the floor panel 12 may be integrally formed by a stamping process.

The load transmittal bracket 20 extends along the axis A, as shown in FIG. 1. This alignment, i.e., the cross-member 18 and the load transmittal bracket 20 extending along the axis A, may result in energy transfer from the load transmittal bracket 20 to the cross-member 18 during a side impact. Alternatively, the load transmittal bracket 20 may be partially disposed along the axis A, i.e., may be offset from the axis A.

Figure 4:
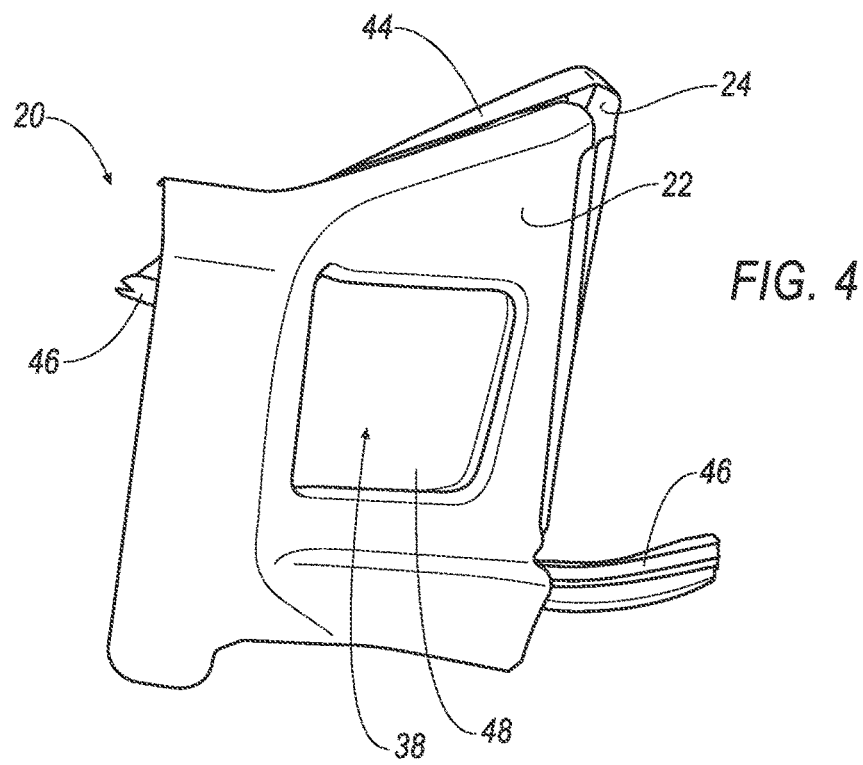
FIG. 4 is a front perspective view of the load transmittal bracket.
Figure 5:
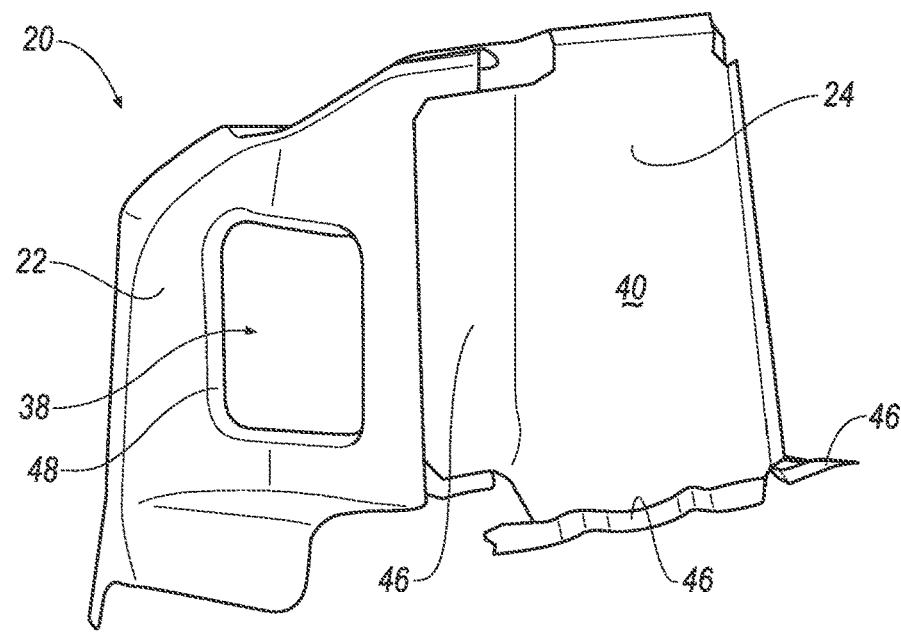
FIG. 5 is a perspective view of the load transmittal bracket.
Figure 6:
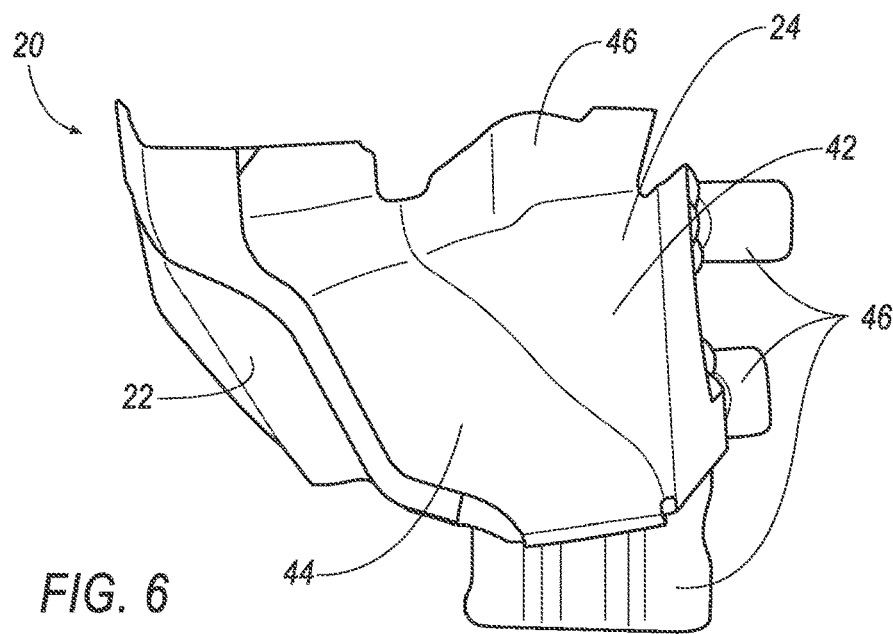
FIG. 6 is a perspective view of the load transmittal bracket.
Figure 7:
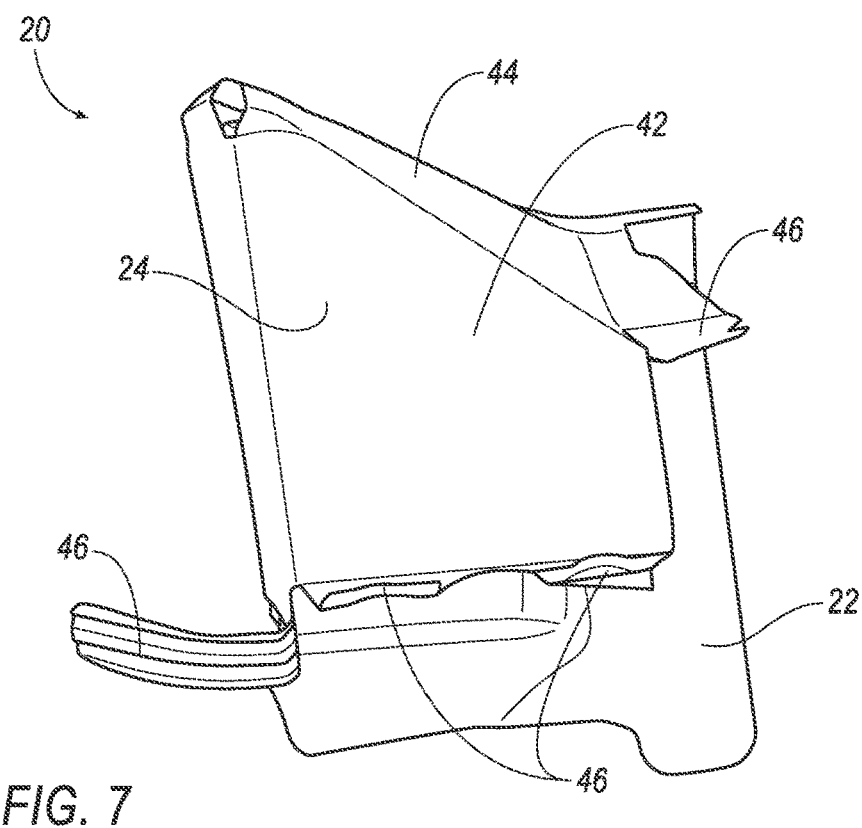
FIG. 7 is a rear perspective view of the load transmittal bracket.

As shown best in FIG. 2 and FIGS. 4-5, the load transmittal bracket 20 may include a cavity 38 defined between the first segment 22 and the second segment 24. The cavity 38 allows access into an interior of the load transmittal bracket and to other components, i.e., the floor panel 12, the cross-member 18, etc., as described further below.

Referring to FIGS. 1-3, the first segment 22 and the second segment 24 may extend along the axis A. As best shown in FIGS. 4-7, the load transmittal bracket 20 may include an end wall 40 that extends in a direction transverse to the axis A. The end wall 40 may be opposite the door opening 16.

The end wall 40 is configured to transfer energy from the door frame 14 or any other component, i.e., the lower sill 34, the rail 26, etc., of the vehicle 11 to the rest of the load transmittal bracket 20, i.e., to dissipate the energy, as further described above. The end wall 40 is adjacent the lower sill 34 and may abut the lower sill 34. The end wall 40 may be opposite the door opening 16 and/or be spaced from the door opening 16 such that a gap 56 exists between a trim 58 and the end wall 40. Alternatively, the end wall 40 may abut the lower sill 34 in the door opening 16 such that the gap 56 does not exist. The load transmittal bracket 20 may include a load transmitting wall 42 that extends from the end wall 40 along the axis A. The load transmitting wall 42 may extend from the door opening 16 toward the cross-member 18 as shown in FIG. 3. The load transmitting wall 42 transfers energy received from the end wall 40 to the cross-member 18 and/or the floor panel 12, which both in turn dissipates energy to other components of the vehicle 11, such as to the opposite load transmittal bracket 20 and/or opposite rail 26, as described above. The load transmitting wall 42 further may support, at least in part, the first segment 22.

The load transmittal bracket 20 may be sized and shaped to facilitate ingress into and egress from the vehicle 11 through the door opening 16. In other words, the load transmittal bracket 20 is configured to be partially or totally recessed behind the lower sill 34 at the door opening 16. For example, the load transmittal bracket 20 may include a top wall 44 that extends along the axis A from the end wall 40 and that tapers toward the axis A in a direction away from the end wall 40. The top wall 44 is tapered toward the axis A in a direction away from the end wall 40 to facilitate the ingress and egress from the vehicle 11 by an occupant, as described further below. Further, the top wall 44 may transfer energy, in addition to the load transmitting wall 42, from the lower sill 34 to other components of the vehicle 11, such as to the opposite load transmittal bracket 20 and/or opposite rail 26 as described above, during side impact. The first segment 22 and the second segment 24 each may include part of the top wall 44.

Figure 8:
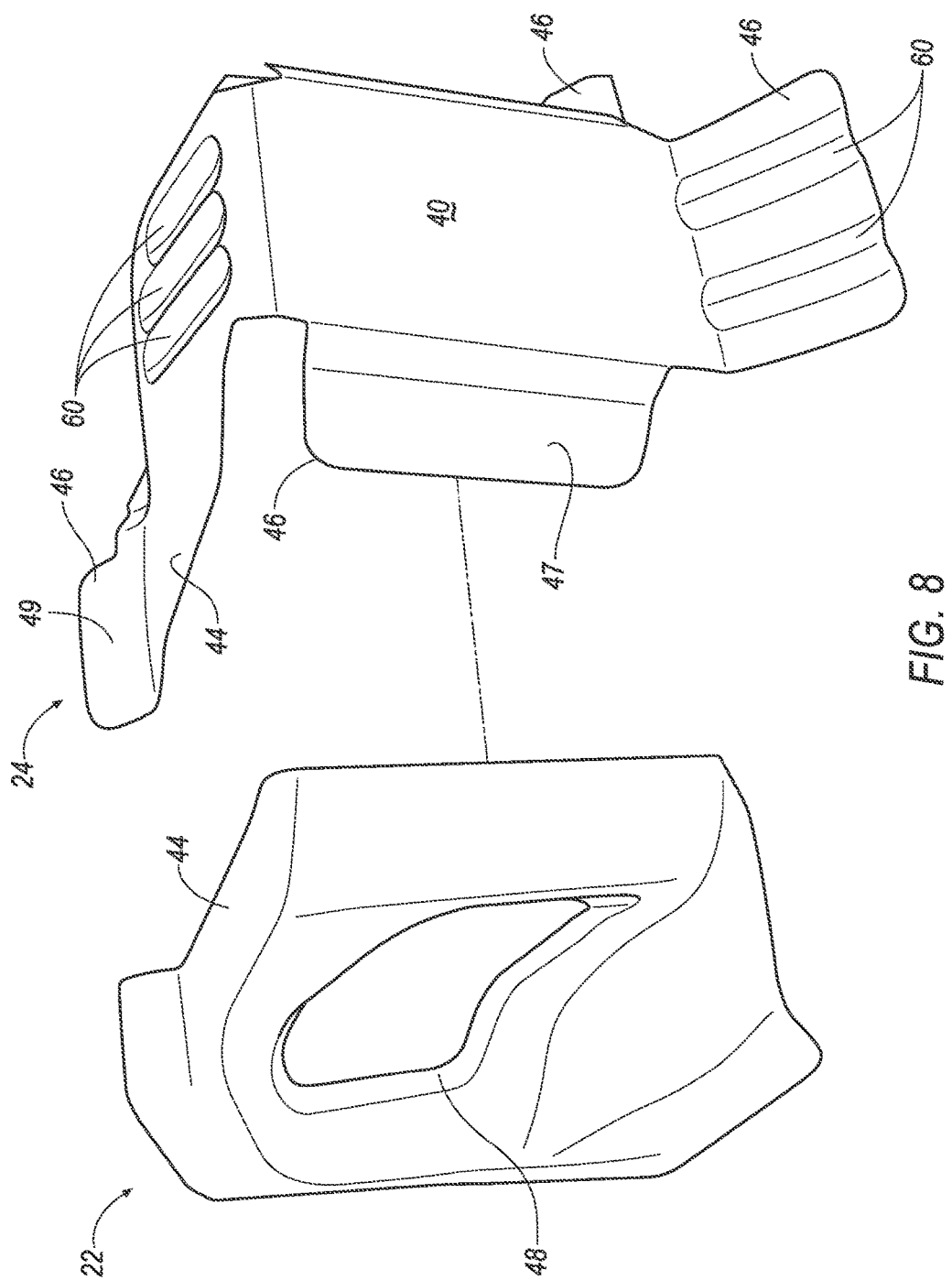
FIG. 8 is an exploded view of the load transmittal bracket.

The width of the first segment 22 changes in a direction along the axis A, as best shown in FIG. 1, FIG. 5 and FIG. 8. Similarly, the height of the second segment 24 changes in a direction along the axis, as best shown in FIG. 1, FIG. 4, FIG. 7, and FIG. 8. Specifically, as shown in FIGS. 1-2, the height of the second segment 24 tapers and the width of the first segment 22 increases in a direction along axis A from the door opening 16 toward the cross-member 18. This shape change facilitates, at least in part, ingress and egress from the vehicle 11.

As shown in FIGS. 4-8, the load transmittal bracket 20 may have one or more flanges 46 that extend from the second segment 24. The second segment 24 includes flanges 46 for connecting the second segment 24 with another vehicle 11 component such as the first segment 22, the floor panel 12 or the cross-member 18. In addition to, or in the alternative to the flanges 46 of the second segment 24, the first segment 22 may include similar flanges. The second segment 24 may be connected in any suitable way to other components of the vehicle 11 with the flanges 46, as described further below.

With reference to FIGS. 4-5 and FIG. 8, the load transmittal bracket 20 may include a hole 48 defined by the first segment 22, in communication with the cavity 38. The hole is configured to receive a weld instrument into the cavity 38 through the hole 48, in other words, the hole is sized and shaped to receive a weld instrument in a suitable way for the weld instrument to perform a welding operation in the cavity. As described further below, the hole 48 defined by the first segment 22 creates an opening to the cavity 38 defined by the first segment 22 and the second segment 24. The hole 48 allows the weld instrument or other welding item, i.e., an instrument used to weld two or more objects together, to access parts of the vehicle 11 that might otherwise have blocked access. The weld instrument may be a weld tip, a weld head, etc.

The rail 26 may support the cross-member 18. The rail 26 may be welded to the cross-member 18 or attached in any suitable way. The rail 26 may be welded in the cavity 38 disposed between the first segment 22 and the second segment 24. Specifically, the cavity 38 may be accessed with the welding instrument through the hole 48.

The ability of the load transmittal bracket 20 to receive a welding instrument may facilitate manufacturing efficiency. For example, several vehicle 11 components in close proximity to the load transmittal bracket 20 may only be welded by a welding instrument that enters the cavity 38 through the hole 48 once the load transmittal bracket 20 is installed. Therefore, the load transmittal bracket 20 may make production more efficient, as a large group of vehicle 11 components may be installed and welded upon at one time.

As best shown in FIGS. 2-3, the load transmittal bracket 20 may abut the cross-member 18. The load transmittal bracket 20 may abut the cross-member 20 free of a weld between the load transmittal bracket 20 and the cross-member 18, or may be connected to one another through any suitable method such as fastening or welding. A surface 50 of the cross-member 18 adjacent to the load transmittal bracket 20 may be substantially flat and/or may take any suitable cross-sectional shape. Alternatively the surface 50 may contain one or more crevices 52 for receiving one or more portions of the load transmittal bracket 20.

The first segment 22 of the load transmittal bracket 20, specifically, may abut the cross-member 18 free of a weld between the first segment 22 and the cross-member 18. In one embodiment, the first segment 22 may be solely supported by the second segment 24, which may be fixed to the floor panel 12 and/or the cross-member 18. In this configuration, the first segment 22 may both provide accessibility for the welding instrument and may transfer energy during a side impact, as described above. However, in other embodiments, the first segment 22 may be fixed to other vehicle 11 structures, i.e., structures that, at least in part, form the vehicle 11, including being welded to the cross-member 18.

The load transmittal bracket 20 may include a means for transmitting force from the door frame 14 to the cross-member 18 during a side impact. As one example, this means may be the load transmitting wall 42, the end wall 40, and the top wall 44 of the load transmittal bracket 20, as described above and shown in FIGS. 4-7, and structural equivalents thereof.

As best shown in FIG. 1 and FIGS. 4-7, at least one of the flanges 46, as set forth above, extends from the end wall 40 and faces the door opening 16. However, one or more flanges 46 may extend in any direction from the end wall 40. The flange 46 may fix the end wall 40 and the load transmittal bracket 20 to another vehicle 11 structure. The flange 46 may fix the second segment 24 to the first segment 22 and/or the flanges 46 may fix the second segment 24 to the floor panel 12 and the cross-member 18.

As shown in FIGS. 4-7, the top wall 44 of the load transmittal bracket 20 includes at least one flange 46. As shown in FIG. 3, the top wall 44 is spaced from the floor panel 12. The flange 46 of the top wall 44 may fix the top wall 44 to another vehicle 11 structure. In an embodiment, the flange 46 of the top wall 44 may be fixed to the cross-member 18. Additionally other flanges of the top wall 44 are part of the second segment 24. These flanges 46 may fix the second segment 24 to the first segment 22 and to the cross-member 18.

The top wall 44 may support a seat mounting apparatus (not shown). The seat mounting apparatus can include any vehicle 11 structures used to support a seat, including the seat. The seat may be directly mounted onto the top wall 44 of the load transmittal bracket 20, whereby the seat may be touching or adjacent to the top wall 44. Alternatively, the seat may be indirectly supported by the top wall 44, i.e., supported, in part, by additional vehicle 11 components disposed between the seat and the load transmittal bracket 20. The vehicle body structure 10 may take any suitable configuration to support the seat and any suitable vehicle 11 components may be disposed between the vehicle body structure 10 and the seat. The second segment 24 may contain ridges and/or grooves 60, as shown in FIG. 8, to facilitate attachment to additional vehicle 11 structures or to the seat.

As shown in FIG. 8, the first segment 22 and the second segment 24 of the load transmittal bracket 20 are individually formed. For example, the first segment 22 and the second segment 24 may be formed by stamping, molding, casting, etc. Alternatively, the first segment 22 and the second segment 24 may be made by any suitable method. At any time, either before or after connecting the first segment 22 and the second segment 24, the first segment 22 may be stamped to make the hole 48 and/or to form a rectangular shape in cross-section, though any suitable shape and method of creation will suffice. For example, the first segment 22 may be modified with an extended top wall 44 such that a modified load transmittal bracket is elongated relative the second segment 24. In this embodiment, the top wall 44 of the first segment 22 may cover at least one of the top wall 44 and the end wall 40 of the second segment 24, and may be fixed to the top wall 44 and/or end wall 40 of the second segment 24, e.g., by welding. This elongated top wall 44 may alter the energy absorbability of the modified load transmittal bracket relative to the load transmittal bracket 20.

The first segment 22 and the second segment 24 may be welded together in multiple areas. The flanges 46 of one segment may overlap the other segment creating places to weld the segments together. For example, FIG. 8 shows a left flange 47 overhanging from the second segment 24. When the second segment 24 is close to the first segment 22, in an orientation that resembles the configuration of the load transmittal bracket 20, the left flange 47 overlaps the first segment 22. The left flange 47 and the first segment 22 are welded together at the overlap location defined by the orientation described above, effectively welding together the first segment 22 and the second segment 24. Similarly, a top flange 49 of the second segment 24 and/or of the top wall 44 of the second segment 24 may overlap with the top wall 44 of the first segment 22. The top flange 49 may be welded to the first segment 22 at the overlap location defined by the orientation described above, effectively welding the first segment 22 to the second segment 24. Flanges 46 that do not overlap may also be connected. The flanges 46 may be positioned in any suitable manner, not limited to overlapping, in preparation for fixing the load transmittal bracket 20.

In an embodiment, the first segment 22 and the second segment 24 are fixed together by welding alone, and not in any other way, and the load transmittal bracket 20 is fixed to the floor panel 12 by welding alone, and not in any other way. However, in other embodiments, the first segment 22 and the second segment 24 may be connected using any fastener or any other suitable method.

The load transmittal bracket 20 may be customized for use in different vehicles. For example, the first segment 22 may be modified so that the load transmittal bracket 20 may fit into spaces of various sizes. Additionally, the width of the first segment 22 can be adjusted to modify the ingress and egress functionality of the load transmittal bracket 20. Similarly, the hole 48 defined by the first segment 22 may be shaped differently depending on the preferred degree of weld accessibility of the load transmittal bracket 20. The load transmittal bracket 20 may be customized in any suitable manner.

The load transmittal bracket 20 may be made of materials that can readily absorb and transfer energy. For example, the load transmittal bracket 20 may be made of any metal, plastic, polyurethane, rubber, aluminum, and/or carbon. However, the load transmittal bracket 20 may be made of any suitable material. The load transmittal bracket 20 may either be made of a plurality of materials or of a single material.

As shown in FIG. 9, the load transmittal bracket 20 may generally retain its shape to dissipate energy to other components of the vehicle 11, such as to the opposite load transmittal bracket 20 and to the opposite rail 26 as described above, during a vehicle 11 crash. The impact force F may push on the lower sill 34 and may be transmitted through the lower sill 34 to the rail 26, which may deform the lower sill 34 and the rail 26. At the location of the impact force F, the impact force F is transmitted to the load transmittal bracket 20. The end wall 40 of the second segment 24 initially receives the energy and transfers the energy to the rest of the load transmittal bracket 20 and subsequently to the cross-member 18 and the floor panel 12 for dissipation to other components of the vehicle 11, such as to the opposite load transmittal bracket 20 and/or the opposite rail 26 as described above. This dissipation reduces floor deformation during the impact.

In situations where the impact force F is offset from the load transmittal bracket 20, the load transmittal bracket 20 may nevertheless still both absorb at least some of the energy generated from the impact force F and transfer at least some of the energy to the cross-member 18 and to the floor panel 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A load transmittal bracket comprising:
a first segment and a second segment welded to the first segment defining a cavity therebetween extending along an axis;
an end wall extending transverse to the axis, a load transmitting wall extending from the end wall along the axis, and a top wall extending from the end wall along the axis and tapering toward the axis in a direction away from the end wall;
at least one flange extending from the second segment; and
the first segment defining a hole in communication with the cavity and configured to receive a weld instrument into the cavity through the hole.

2. The load transmittal bracket as set forth in claim 1 wherein the first segment has a width that increases in a direction along the axis in a direction away from the end wall.

3. The load transmittal bracket as set forth in claim 1 wherein the first segment has a height that tapers in a direction along the axis in a direction away from the end wall.

4. The load transmittal bracket as set forth in claim 1 wherein the at least one flange is located on an end wall of the load transmittal bracket.

5. The load transmittal bracket as set forth in claim 1 wherein the at least one flange is located on the top wall.

6. The load transmittal bracket as set forth in claim 1 wherein the second segment includes the end wall and the load transmitting wall.

7. The load transmittal bracket as set forth in claim 1 wherein the first segment and the second segment each include a part of the top wall.

8. The load transmittal bracket as set forth in claim 7 wherein one of the at least one flange is a part of the top wall of the second segment and is fixed to the first segment.

* * * * *